United States Patent [19]

Beach

[11] 3,925,792
[45] Dec. 9, 1975

[54] BATTERY TEST APPARATUS FOR USE IN A PHOTOGRAPHIC CAMERA

[75] Inventor: David E. Beach, Penfield, N.Y.
[73] Assignee: Eastman Kodak Company, Rochester, N.Y.
[22] Filed: June 17, 1974
[21] Appl. No.: 480,443

[52] U.S. Cl. .............................................. 354/60
[51] Int. Cl.² ....................................... G03B 17/18
[58] Field of Search ...................................... 354/60

[56] References Cited
UNITED STATES PATENTS

| | | | |
|---|---|---|---|
| 3,224,350 | 12/1965 | Stimson | 354/60 |
| 3,646,859 | 3/1972 | Umemura | 354/60 |

*Primary Examiner*—John M. Horan
*Attorney, Agent, or Firm*—D. P. Monteith

[57] ABSTRACT

Apparatus for determining the operational status of a camera battery includes a signal member mounted within the camera for movement between a normally disposed nonviewable position and a viewable position wherein the signal member signals an unoperational camera battery. An electromagnet arranged to be selectively coupled to the battery is energized in accordance with the battery output voltage. The electromagnet includes a resiliently biased armature arranged to retain the signal member in its nonviewable position, which occurs when the battery voltage is above a predetermined level. In another preferred embodiment a releasably engaged armature is located to retain the signal member in its nonviewable position against the influence of a spring biased control member that continuously urges the signal member towards its viewable position. When the battery is defective and the signal member is moved into its viewable position, a stop member cooperates with the armature to latch the signal member in that position until the defective battery is replaced.

6 Claims, 7 Drawing Figures

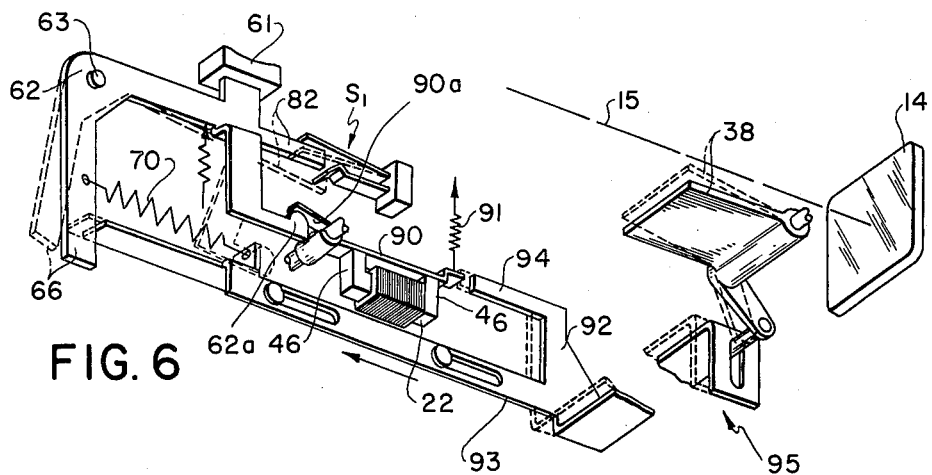
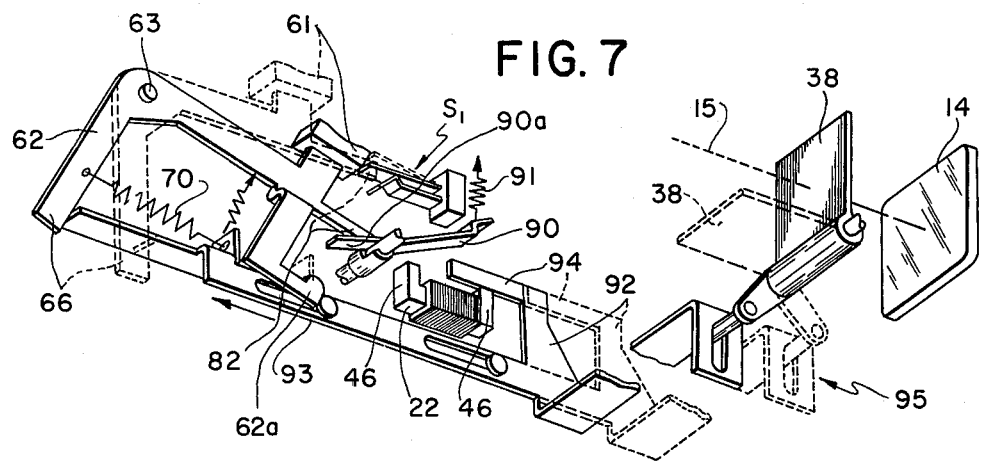
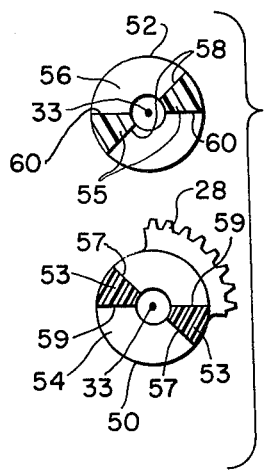
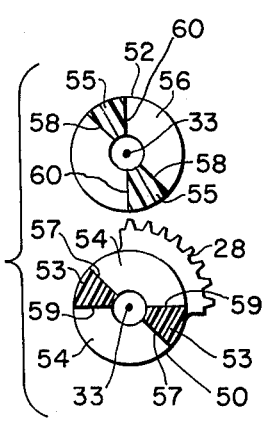
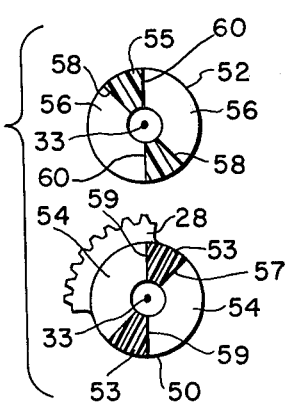

BATTERY TEST APPARATUS FOR USE IN A PHOTOGRAPHIC CAMERA

BACKGROUND OF THE INVENTION

1. Field of the Invention

This invention relates to photographic cameras, and more particularly to apparatus for determining the operational status of a camera battery.

2. Description of the Prior Art

Many of today's commercially available cameras include automatic exposure control systems energized by a battery to adjust automatically either a diaphragm or camera shutter speed or both in accordance with scene light conditions. The diaphragm and the shutter may be controlled by electromagnets coupled to a photoconductive circuit.

In a camera of this type, inadequate battery power can cause the electromagnets to fail to properly operate and thereby produce an extremely, improperly exposed film that is either seriously overexposed or underexposed. Often there is no means provided in the camera to apprise the camera operator of a defective battery and much film can be wasted before the operator is aware of the situation.

There are prior art patents that disclose apparatus for determining the operational status of a battery. Such apparatus may utilize an indicator lamp that is arranged to be energized only when the battery power is inadequate. One problem that arrangements of this type present is that battery power is required to energize the lamp and if the battery power is too low there can be no indicator signal and the battery test apparatus malfunctions. Examples of patents disclosing battery checking apparatus in which a lamp when powered by the battery is used to indicate a defective battery condition are U.S. Pat. No. 3,447,060 issued to D. C. Tedd on May 27, 1969, and U.S. Pat. No. 3,505,663 issued to W. J. Yule on Apr. 7, 1970.

U.S. Pat. No. 3,699,857, which issued to Wagner et al. on Oct. 24, 1972, discloses one way to avoid the aforementioned problem. In the Wagner et al. patent, battery test apparatus includes an indicator lamp arranged to be energized only if the battery is operational, the unlighted lamp being the signal that the battery is defective. Apparatus of this type, along with that apparatus disclosed in the aforementioned Tedd and Yule patents, is vulnerable to the indicator lamp being defective, which condition would produce no positive, direct signal at all which in many cases would provide a misleading battery status indication.

There are prior art patents that employ mechanical arrangements for indicating battery status. One such arrangement, disclosed in U.S. Pat. No. 3,435,745 issued to Y. Fukushima on Apr. 1, 1969, includes a magnetically latched shutter control member urged towards a blocking position to block a shutter release member to prevent an exposure when the camera battery has insufficient power. In so doing, film cannot be wasted when battery power is low. When the release member is blocked, the battery power is presupposed to be deficient. A problem with an arrangement of this type is that there is no positive, viewable signal to indicate that the release member is "hung-up." An operator unfamiliar with the camera may not know the reason for the blockage of the release member and attempt to overpower the camera mechanism or, for that matter, may be under the mistaken impression that the release member had completed its full release cycle. In the latter event, the operator might advance film and continue to attempt to photograph other scene objects.

SUMMARY OF THE INVENTION

It is therefore an object of the invention to provide improved battery test apparatus of the type which does not require battery power to either energize or actuate an indicator member to signal an unoperational battery.

It is a further object of the invention to provide battery test apparatus that produces a positive, unambiguous signal that a low battery condition exists.

It is yet another object of the instant invention to provide a battery test apparatus of the aforementioned type in which an indicator member for signalling a low battery condition remains in its signal position until the "dead" battery is replaced.

In accordance with the above objects, apparatus for signaling the operational status of a battery includes circuit means connectable to a received battery to be tested and adapted to produce (1) a first control signal when the electrical potential produced by such a battery is above a predetermined level and (2) a second control signal when the electrical potential is below the predetermined level, signal means operably associated with the circuit means for producing an observable indicator signal in response to the circuit means producing the second control signal, and means for maintaining the existence of the observable indicator signal so long as such a battery remains in its received position.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIGS. 3–5 are cross-sectional views of the lost motion device shown in FIGS. 1 and 2 taken along the lines 1–1 and 2–2 therein as viewed from above showing various operational positions of the lost motion device;

FIG. 6 is a view of a portion of camera, similar to FIG. 1, but showing an alternative embodiment of the battery test apparatus; and FIG. 7 is a perspective view of the camera and the battery test apparatus, similar to FIG. 6, only showing the test apparatus in its battery test position and the status indicator member in its signal position.

DESCRIPTION OF A PREFERRED EMBODIMENT

Figures 1, 2:
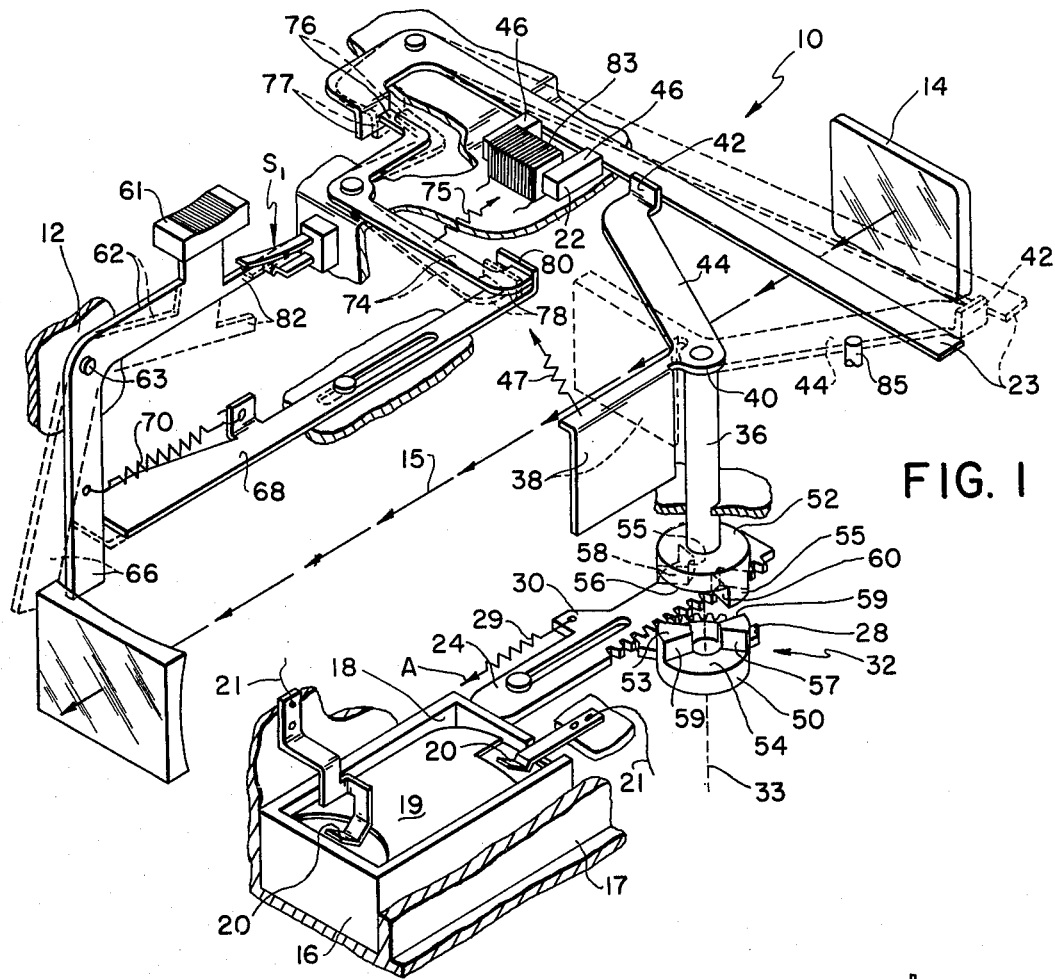
FIG. 1 represents a perspective view of a portion of a camera having battery test apparatus located therein and showing a portion of the test apparatus in exploded form to more clearly illustrate a preferred embodiment of the instant invention.
FIG. 2 is a view, partially in section and partially in perspective, exploded form, showing a lost motion device for returning a battery status indicator member to its pretest position in response to removal of an unoperational battery from the camera.

Because photographic cameras are well known, the present description will be directed in particular to elements forming part of, or cooperating more directly with, apparatus in accordance with the present invention. It is to be understood camera elements not specifically shown or described may take various forms well known to those having skill in the art.

Referring to the preferred embodiment illustrated in FIG. 1, there is shown generally a camera 10 comprising a housing 12 and a viewfinder 14 having a viewing axis 15. Within housing 12 there is positioned a drawer 16 that is mounted for slidable movement in either direction between retaining walls 17 between a battery operational position shown in FIG. 1 and a battery replacement position shown in FIG. 2. Drawer 16 defines a well or chamber 18 for receiving a camera battery 19. Located within camera 10 in the path of drawer 16 is an electrical contact 20 that contacts one terminal of battery 19 when the battery is located in its operational position. Mounted on wall 17 is a second contact 20 adapted to contact the opposite terminal of battery 19. Connected to each of contacts 20 is an electrical conductor wire 21 for electrically coupling battery 19 to the camera exposure control circuits (not shown) and to a battery test circuit, described in detail hereinafter, comprising control switch S1 and an electromagnet 22 having a pivotally mounted retaining or blocking armature 23. It will be understood that drawer 16 although normally disposed within housing 12 is accessible to a camera operator such as through a hinged camera door (not shown) so that the drawer can be pulled in the direction of arrow A toward the outside of camera 10 to facilitate battery replacement.

Abuttingly engaging the far end of drawer 16, as viewed in FIG. 1, is one end of a spring biased gear rack 24, which rack is directly coupled to a gear sector 28 as shown. Gear rack 24 is biased in the direction of arrow A by a tension spring 29 connected to projection 30 whereby the rack is caused to move in the direction of arrow A upon movement of drawer 16 to its battery replacement position. It shall be understood of course that due to the structural strength of the battery casing drawer 16 is not a necessary element and battery 19 may be directly located between the contacts 20 in direct contact with gear rack 24. With this latter arrangement, gear rack 24 is responsive to the absence or presence of the battery in its received position in the camera.

Gear sector 28 is integral with the projects radially from the bottom of a lost motion coupling device 32. Secured to the top of lost motion device 32 so as to entend vertically along axis 33 is a pole 36 having an indicator member or flag 38 projecting radially with respect to the upper portion of the pole as shown. Rigidly secured to the top of pole 36 and the top edge of flag 38 for synchronous movement therewith is a spring biased control member 40. Control member 40 is oriented on the end of rod 36 relative to axis 33 such that finger portion 42 of arm 44 abuttingly engages retaining armature 23 when the latter is engaging armature pole pieces 46 as shown by the solid lines of FIG. 1. In this position, armature 23 serves to block flag 38 acting through spring 47 from pivoting into alignment with viewing axis 15 into its viewable position.

As is shown most clearly in FIGS. 1 and 2, lost motion coupling member 32 is comprised of lower and upper dogs 50 and 52, respectively, disposed in tandem along axis 33. Lower dog 50 includes a pair of projections or teeth 53 that are diametrically opposed to each other about axis 33. Each projection subtends a 45° arc so as to define a pair of larger (135°) arcuate segments 54 therebetween. Likewise upper dog 52 includes a pair of diametrically opposed, 45° arcuate projections 55 having a pair of 135° arcuate segments 56 therebetween. As is shown most clearly in FIGS. 3–5, dogs 50 and 52 are oriented relative to each other about axis 33 so that segments 56 are arranged to loosely receive projections 53. Correspondingly, the aforementioned segments 54 are positioned to loosely receive projections 55. In this manner, a 90° rotational movement of dog 50 is permitted while dog 52 remains at rest and vice versa.

When drawer 16 is positioned in its battery replacement position dogs 50 and 52 are positioned relative to each other about axis 33 as shown in FIG. 3. As drawer 16 is moved toward its battery operational position, dog 50 is caused to rotate 90° in the clockwise direction under the influence of gear sector 28. As this occurs upper dog 52 remains at rest and flag 38 remains in its nonviewable position pointed parallel to viewing axis 15 as shown in FIG. 1. When drawer 16 is properly seated in camera 10, also shown in FIG. 1, the relative positions of projections 53 and 55 are as shown in FIG. 4, that is, edges 57 of projections 53 abuttingly engage edges 58 of projections 55.

Mounted external to housing 12 so as to accessible to a camera operator is a battery test button 61. Connected to button 61 is an L-shaped release lever 62 that is rotatably coupled to a pivot 63 mounted on housing 12. Abuttingly engaging the right-hand side of leg 66 of lever 62 is one end of an elongate, horizontally disposed control member 68. Member 68 is maintained in its engaging position by means of a tension spring 70, as shown, which spring also functions to draw the control member from right to left in the direction of leg 66 when lever 62 is pivoted in the clockwise direction.

A spring biased releasable latch lever 74 constitutes means for securing retaining armature 23 in its blocking position relative to control member 40 when armature 22 is not energized. Latch lever 74 is spring biased in the counterclockwise direction by a spring 75 into its latch position wherein finger portion 76 abuttingly engages armature tab 77 and opposite end 78 is disposed in the path of detent 80 of control member 68. In its latch position the bias force produced by spring 75 is sufficient to overcome the resultant bias force acting on armature 23 through finger 42 which condition causes the armature to retain flag 38 in its non-viewable position.

To check the operational status of the camera battery, the camera operator using light finger pressure depresses test button 61 to thereby cause lever 62 to pivot in the clockwise direction. Upon this occurrence, control switch S1 is disengaged from detent 82 and is thereby closed, and control member 68 is drawn from right to left under the influence of spring 70. During the latter occurrence, detent 80 is caused to abuttingly engage end 78 of latch lever 74 and to thereby push or pivot the lever in the clockwise direction disengaging finger member 76 from armature tab 77 to thereby free armature 23.

When switch S1 is closed, battery voltage is immediately applied to the input of an electronic switching circuit (not shown) such as the well known Schmitt trigger circuit or the like which has a normally conducting input stage and a normally non-conducting output stage, which is coupled to electromagnet 22. The operational parameters of electromagnet 22 and the switching circuit are selectively controlled so that when the battery voltage is above a particular level, hereinafter called the minimum acceptable operational level, the input of the switching circuit is turned OFF and its output stage is turned ON. When this condition exists a current signal is applied to coil 83, which produces a magnetic flux sufficient to overcome the resultant force exerted by spring 47 acting through control arm 44 and to magnetically latch retaining armature 23 in its blocking position against poles 46. This occurs despite the fact that latch lever 74 is no longer latching armature 23. When this battery condition exists, flag 38 is prevented from pivoting into alignment with viewing axis 15, which condition would be a signal to the camera operator that the battery has inadequate power.

On the other hand, when battery power is below the minimum acceptable operational level, no coil current is produced and control member 40 pivots 90° under the influence of spring 47 against stop 85 whereby flag 38 is positioned to be viewed through viewfinder 14 to signal a defective battery. In this position, armature 23 and control arm 40 are positioned as shown by the dashed lines of FIG. 1 and dogs 50 and 52 are aligned as shown in FIG. 5. In the latter illustration, edges 59 of the lower dog abuttingly engage edges 60 of the upper dog.

Flag 38 is caused to remain in its viewable position until the camera operator replaces the battery, even if the operator removes finger pressure from test button 61. This is because removal of pressure from button 61 causes latch lever 74 under the influence of spring 75 to urge armature 23 in a clockwise direction pinching or latching control arm 44 between the armature and stop 85. Upon this occurrence, flag 38 is secured against movement from its viewable position.

To replace a low voltage or defective battery, drawer 16 is pulled between retaining walls 17 to its battery replacement position shown in FIG. 2. As this occurs, gear rack 24 advances under the influence of spring 29 to thereby cause gear sector 28 and lower dog 50 to rotate counterclockwise. Because of the contact that exists between respectively contacting projections 53 and 55, that is, edges 59 and 60 thereof, when flag 38 is in its viewable position (shown in FIG. 5), upper dog 52 is also caused to rotate counterclockwise 90° to return control arm 44 to its pretest position shown in FIG. 1. Upon this occurrence, armature 23 is restored to its blocking position adjacent poles 46 due to the influence of releasable latch 74.

When the battery is replaced and drawer 16 is returned to its battery operational position in camera 10, projections 53 are caused to rotate clockwise 90° passing freely over arcuate segments 56 to the position shown in FIG. 4 wherein dog 50 is restored to its previous pretest position.

Consider now another preferred embodiment of the instant invention shown in FIG. 6 where elements common to elements shown in FIG. 1 have been identified with the same numerals. A spring biased retaining armature 90 having an offset compliant arm 90a contacting control member 62a is mounted for pivotal movement relative to electromagnet 22. When the battery to be tested has a voltage above the minimum operational level, the magnetic flux produced by coil 83 is sufficient to overcome spring 91 and to retain armature 90 in its battery pretest position engaging poles 46 as shown in FIG. 6. In such position, an arm 92 connected to a control member 93 is permitted to advance only until finger 94 thereof engages the end of armature 90, and flag 38 is prevented from pivoting into the field of view of viewfinder 14. On the other hand, when battery voltage is below the minimum acceptable operational level, no coil current is produced and armature 90 is pivoted counterclockwise under the influence of spring 91 to an unblocking position shown in FIG. 7. When this condition exists, finger 94 moves from right to left beyond the end of armature 90 as lever 62 pivots in the clockwise direction in response to operator pressure on button 61. As this movement occurs, a linkage mechanism 95 coupled to control member 93 pivots flag 38 in a clockwise direction into its viewable position shown in FIG. 7.

The invention has been described in detail with particular reference to two preferred embodiments thereof, but it will be understood that variations and modifications can be effected within the spirit and scope of the invention.

I claim:

1. In a camera having a housing, apparatus for determining the operational status of a camera battery comprising:
   a. an indicator member mounted within said housing and movable between a viewable position to indicate an un-operational battery condition and a nonviewable position, in which position an operational battery condition is indicated;
   b. means for continuously urging said indicator member towards said viewable position;
   c. electrical means energizable in a manner functionally related to the magnitude of the output voltage of a received battery, said electrical means having an output member operably associated with said urging means and mounted for concurrent movement therewith between a retaining position wherein said output member prevents said urging means from moving said indicator member from its nonviewable position and a released position wherein said urging means locates said indicator member in its viewable position, said output member being constructed and located to attain said retaining position in response to energization of said electrical means above a predetermined voltage level;
   d. a manually operatable actuating member;
   e. releasable latch means for maintaining said output member in said retaining position prior to energization of said electrical means;
   f. control means responsive to operation of said actuating member for connecting the received battery to said electrical means and for releasing said latch means; and
   g. means cooperating with said releasable latch means for permitting said output member to maintain said indicator member in its viewable position when the received battery is in an unoperational condition.

2. Apparatus as set forth in claim 1, wherein said output member permitting means includes:
   a. a stop member positioned to locate said urging means in its released position to thereby locate said indicator member in its viewable position; and
   b. means responsive to deactuation of said actuatable means for enabling said releasable latch means to urge said output member towards its retaining position while said urging means is located in its released position, said output member and said stop member being arranged to cooperatively latch said urging means in its released position, whereby said indicator member is maintained in its viewable position when the received battery is in an unoperational condition.

3. Apparatus as set forth in claim 1 further including drive transmitting means operatively coupled to said indicator member urging means for returning said indicator member to its nonviewable position during a battery replacement operation.

4. In a camera having a viewfinder and receiving means for operably locating a source of electrical potential, the improvement comprising:
   a. circuit means adapted to produce (1) a first control signal when the electrical potential produced by a received electrical potential source is above a predetermined level and (2) a second control signal when the electrical potential is below said predetermined level;
   b. actuatable means for electrically connecting the received source to said circuit means;
   c. a viewable status indicator member mounted for movement between (1) a normal, nonviewable position wherein said indicator member indicates the electrical potential produced by such a source is sufficient to properly operate said camera, and (2) a viewable position in which said indicator member is viewable through said viewfinder wherein said indicator member signals the electrical potential produced by the source is insufficient to properly operate said camera;
   d. means for moving said indicator member from said nonviewable position to said viewable position in response to said circuit means producing said second control signal; and
   e. means responsive to said indicator member assuming said viewable position for maintaining said indicator member in said viewable position so long as such a source remains in said receiving means.

5. In a camera having an enclosed housing, and receiving means within said housing for locating a camera battery in an operational position, the improvement comprising:
   a. switch means connected to a received battery and having (1) a normal, open position and (2) an actuated, closed position;
   b. circuit means energizable by such a battery when said switch means is in said closed position and adapted to have (1) a first state when the electrical potential produced by the battery is above a predetermined level and (2) a second state when the electrical potential is below said predetermined level;
   c. an indicator member operably associated with said circuit means and movable within said housing to a viewable position when said circuit means is in said second state to signal the electrical potential produced by the received battery is below said predetermined level; and
   d. means operatable once said indicator member assumes said viewable position for maintaining said indicator member in said viewable position as long as such a battery remain in said operational position.

6. A camera as set forth in claim 5 wherein said indicator member maintaining means maintains said indicator member in said viewable position with said switch means in said open position.

* * * * *